B. F. & C. D. ROUSSEAU.
LOCK FOR MOTOR VEHICLES.
APPLICATION FILED FEB. 19, 1916.
1,220,462.
Patented Mar. 27, 1917.
3 SHEETS—SHEET 1.
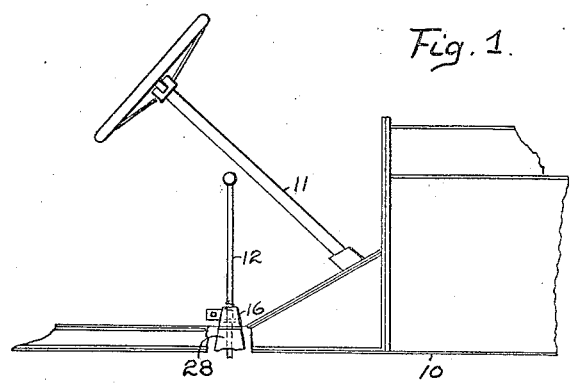
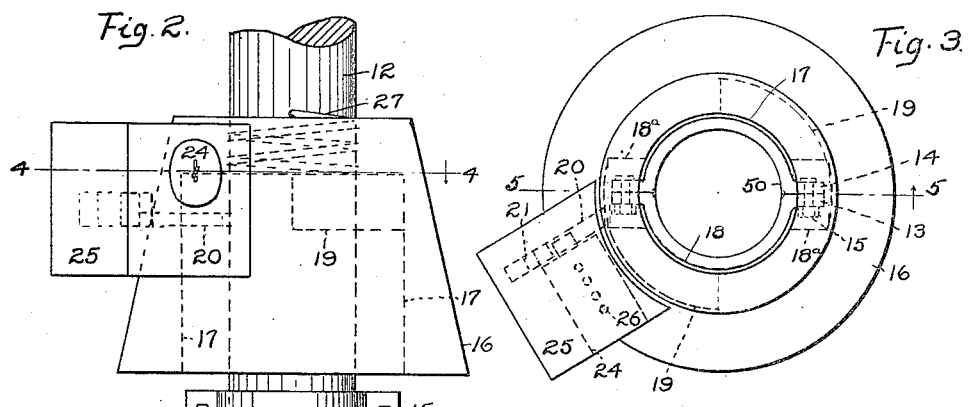
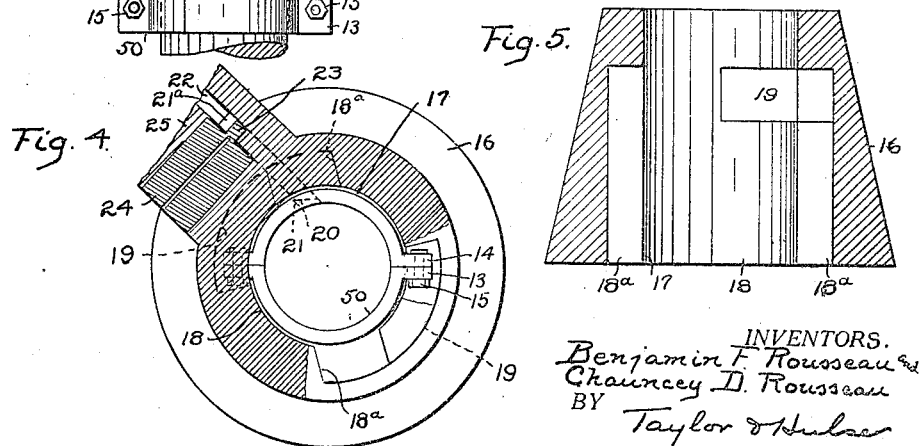
INVENTORS.
Benjamin F. Rousseau &
Chauncey D. Rousseau
BY Taylor & Hulse
ATTORNEYS.

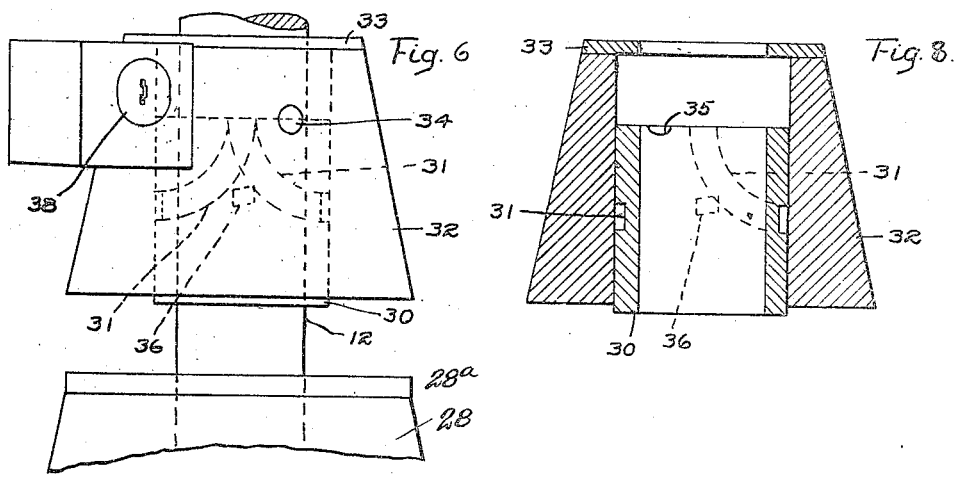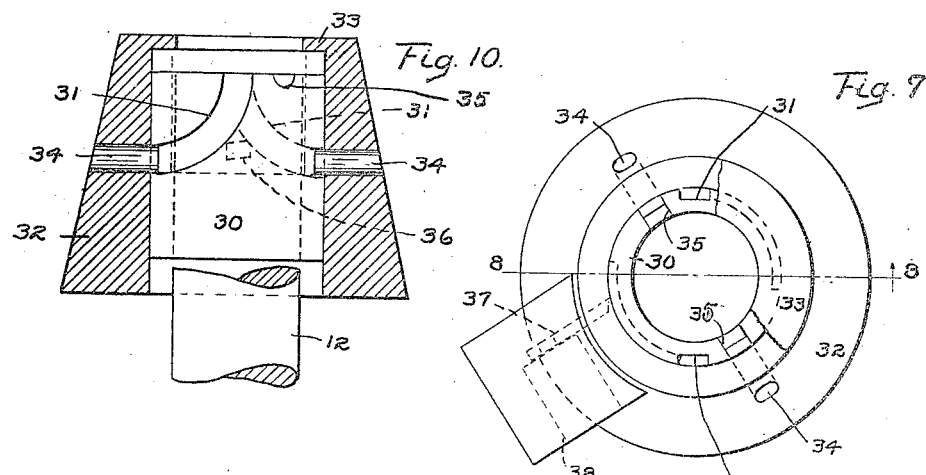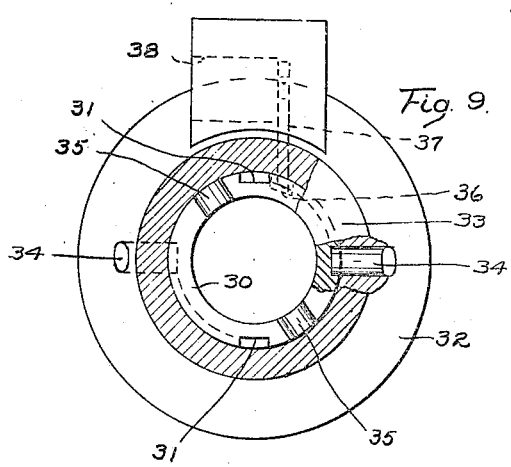

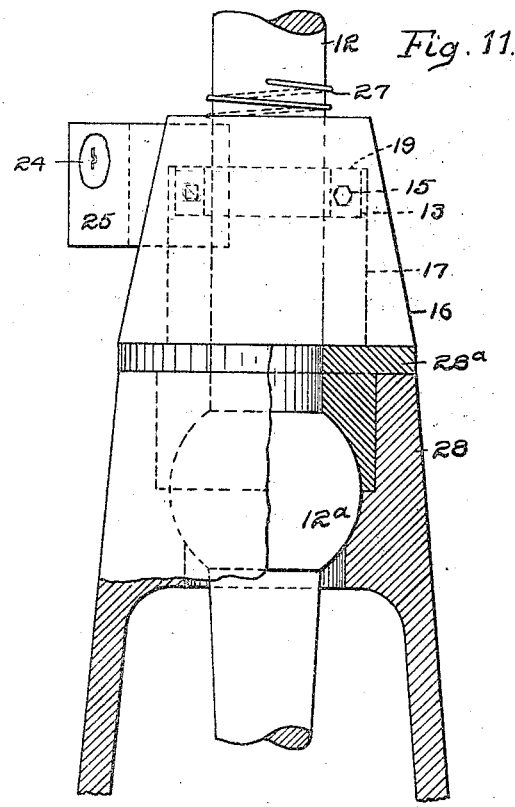

UNITED STATES PATENT OFFICE.

BENJAMIN F. ROUSSEAU AND CHAUNCEY D. ROUSSEAU, OF FORT WAYNE, INDIANA; SAID CHAUNCEY D. ROUSSEAU ASSIGNOR TO SAID BENJAMIN F. ROUSSEAU.

LOCK FOR MOTOR-VEHICLES.

1,220,462.　　　　　　Specification of Letters Patent.　　　Patented Mar. 27, 1917.

Application filed February 19, 1916. Serial No. 79,268.

*To all whom it may concern:*

Be it known that we, BENJAMIN F. ROUSSEAU and CHAUNCEY D. ROUSSEAU, citizens of the United States, residing at Fort Wayne, in the county of Allen and State of Indiana, have invented new and useful Improvements in Locks for Motor-Vehicles, of which the following is a specification.

The invention relates to devices for locking motor vehicles. Drivers of motor vehicles recognize the advantage of being able to lock their machines against theft or unauthorized use when they leave them unoccupied. The most practical and satisfactory lock is one which prevents the moving of a vehicle by its own motive power. When a motor vehicle and its engine are brought to rest its transmission gears are shifted to their neutral position so that when the engine is again started the gears must be shifted into one of the driving connections before the vehicle may be driven. A lever is the common expedient by which the driver shifts the gears.

The object of the invention is to provide a cheap and simple device by which the gear-shifting lever of a motor vehicle may be locked against all movement and thereby prevent an unauthorized person from driving the vehicle.

In the accompanying drawings we illustrate how the invention may be carried out in practice in which Figure 1 is a fractional side elevational view of a vehicle having the invention applied to its gear-shifting lever.

Fig. 2 is an enlarged elevational view of the lever having the locking device thereon in the unlocked position.

Fig. 3 is a plan of the same, the lever being omitted.

Fig. 4 is a cross-section on line 4—4 of Fig. 2, the device being in the locked position.

Fig. 5 is a vertical sectional view of the locking sleeve.

Fig. 6 is an elevation of a modification in the unlocked position.

Fig. 7 is a plan view of the same.

Fig. 8 is a vertical section on line 8—8 of Fig. 7.

Fig. 9 is a plan view partly in section of the device shown in Fig. 6, the sleeve being in locked position.

Fig. 10 is a vertical central section of the same.

Fig. 11 is side-elevation of a transmission lever with the invention applied thereto, the support and socket being shown in section.

Referring to the drawings 10 indicates the vehicle, 11 its steering post and 12 its gear-shifting lever. A stop or boss 50 is suitably clamped on or otherwise secured to the lever a suitable distance above the floor of the vehicle or some other suitable fixed part of the vehicle which is adjacent the lever. In Fig. 11 the fixed part of the vehicle is the frame 28 which supports the ball $12^a$ of the lever 12, and within the socket $28^a$ of which frame the ball is seated to permit the lever to be rocked on said seat as a pivot. In Figs. 2–4 the stop number is a two part collar 13, 14 suitably secured to the lever by bolts 15, the ends of which members constitute the effective stop. A locking sleeve 16 is slidably mounted on the lever and is provided with central aperture 18 which is of sufficient diameter and of suitable conformation to permit the sleeve to slide on lever 12. Vertically disposed recesses $18^a$ are provided in the wall of sleeve 16 and lead from aperture 18 to accommodate the vertical movement of the bolted ends of stop 50. Horizontal recesses 19 in opposite sides of the sleeve communicate with recesses $18^a$ and are adapted to receive the said ends of stop 50 when the sleeve is revolved after having been lowered. A spring pressed bolt 20 slidably carried by sleeve 16 and housing 25 is adapted to engage recess 21 provided in stop 50 when, by the rotation of sleeve 16, the bolt is brought into register with the recess. The bolt is slidable in a suitable aperture 22 provided in the housing and sleeve and a head or lug $21^a$ on the bolt is adapted to be engaged by depending lever 23 on cylinder 24, the cylinder having pins 26 to be engaged by a key for rotating the cylinder and withdrawing bolt 20 from engagement with stop 50. Any suitable locking device by which the sleeve may be locked to stop 50 and lever 12 will suffice. Spring 27 is connected to the lever and to the sleeve to hold the sleeve in its elevated or unlocked position. When the sleeve is lowered its bottom flat surface meets the top flat surface of socket $28^a$ or other fixed object on the vehicle, and when the sleeve is rotated thereon to cause the stop to engage in the recesses in the sleeve, the sleeve tightly engages the socket and is locked in that position by bolt 20. The lever is now in the neutral position and the gears cannot be shifted out of neutral until the sleeve is unlocked and elevated on the lever.

In Figs. 6-9, we illustrate a modification in which collar 30, having curved grooves 31 provided in its wall, is secured to lever 12 at a suitable point. Sleeve 32 having cap 33 integral or connected to it is loose on the lever and is provided with inwardly projecting lugs 34 which are adapted to be engaged in grooves 31. The grooves and pins cause the sleeve as it is moved downwardly, to rotate and to make contact along its lower end with the fixed object 28ª similarly to sleeve 16. Notches 35 in the upper end of the collar are intended to receive pins 34 for supporting the sleeve in its upper inoperative position. A recess 36 in collar 30 is adapted to receive the end of bolt 37 when the sleeve has been brought into contact with the fixed object and lock 38 releases the bolt when desired.

What we claim is:

1. The combination with a lever of a fixed member adjacent the lever, a fixed member on the lever, a revoluble and slidable member on the lever and adapted to engage both fixed members and means to releasably lock the revoluble and slidable member to the fixed member on the lever.

2. The combination with a lever, a fixed member adjacent the lever, a collar secured to the lever, means revolubly and slidably mounted on the lever adapted to engage the collar and fixed member and means to releasably lock the latter means to the collar.

3. The combination with a collar fixed to the gear-shifting lever of a vehicle, of a revolubly and slidably mounted sleeve on the lever having means thereon adapted to engage the collar, a fixed abutment independent of the lever, adapted to be engaged by the sleeve and with reference to which the lever is movable and a lock to releasably secure the sleeve to the collar when the sleeve engages the fixed abutment.

4. The combination with a lever, of a fixed abutment relative to which the lever is movable, a member fixed to the lever, a member slidably and revolubly carried by the lever and adapted to engage the fixed abutment, a laterally projecting stop on one of the members, the other member having a cutaway portion therein adapted to receive the stop when the slidable and revoluble member is rotated and means to releasably lock the two members when the stop is in engagement with the cut-away portion and the revoluble member is in engagement with the fixed abutment.

5. The combination with a lever of a stop secured to the lever, a sleeve slidably and revolubly mounted on the lever and encircling the stop and having a transversely extending recess in its wall adapted to receive the stop when the sleeve is rotated, a fixed abutment adjacent the lever and adapted to be engaged by the sleeve, and means to releasably lock the sleeve to the stop when the stop is engaged in the recess and the sleeve is in engagement with the fixed abutment.

In witness whereof we hereunto subscribe our names this 16th day of February, 1916.

BENJAMIN F. ROUSSEAU.
CHAUNCEY D. ROUSSEAU.